ated, Vol. 18, pp. 672-674

United States Patent
Bartley et al.

[15] 3,642,489
[45] Feb. 15, 1972

[54] FEED PRODUCT CONTAINING NONPROTEIN NITROGEN COMPOUNDS AND METHOD FOR PRODUCING SAME

[72] Inventors: Erle E. Bartley; Charles W. Deyoe, both of Manhattan, Kans.

[73] Assignee: Kansas State University Research Foundation, Manhattan, Kans.

[22] Filed: Apr. 18, 1969

[21] Appl. No.: 817,499

Related U.S. Application Data

[63] Continuation-in-part of Ser. No. 517,074, Dec. 28, 1965, abandoned.

[52] U.S. Cl. ........................................................99/2 R
[51] Int. Cl. ........................................................A23k 1/00
[58] Field of Search..........................99/2.2 N, 2, 83; 71/28

[56] References Cited

UNITED STATES PATENTS

| | | | |
|---|---|---|---|
| 2,840,473 | 6/1958 | Lux | 99/2 |
| 3,180,735 | 4/1965 | Titus | 99/2 |
| 3,416,928 | 12/1968 | Freese | 99/2 |
| 3,490,912 | 1/1970 | Freese | 99/2 |
| 2,293,845 | 8/1942 | Millar | 99/2 |
| 3,259,501 | 7/1966 | Ulrey | 99/2 |

FOREIGN PATENTS OR APPLICATIONS

| | | | |
|---|---|---|---|
| 233,789 | 5/1961 | Australia | 99/2 |

OTHER PUBLICATIONS

Kirk-Orthmer Encyclopedia of Chemical Technology, 2nd Edition, Vol. 18, pp. 672-674

*Primary Examiner*—Norman Yudkoff
*Assistant Examiner*—Curtis P. Ribando
*Attorney*—Schmidt, Johnson, Hovey, Williams and Chase

[57] ABSTRACT

A reacted, palatable, nontoxic, processed food product for ruminant animals comprising a protein and energy producing composition having modified interacted protein and energy producing constituents wherein the energy producing constituent is derived from a starch bearing material such as initially ungelatinized grains, grasses, roughage, or vegetable starches and the protein producing constituent is derived form a nonprotein nitrogenous substance such as urea, other amides or ammonium salts. The material and substance are admixed and then processed in an extruder-cooker in the presence of sufficient moisture and under conditions of heat and pressure to assure gelatinization of a major proportion of the starch in the starch bearing material while intimately intermingled with the nonprotein nitrogenous substance to produce the reacted composition. The processed product is characterized by slower ammonia release from the nonprotein nitrogenous substance, increased synthesis of rumen microbial protein, reduced toxicity, and avoidance of the problem of constituent segregation often encountered with mixed feed compositions.

5 Claims, 1 Drawing Figure

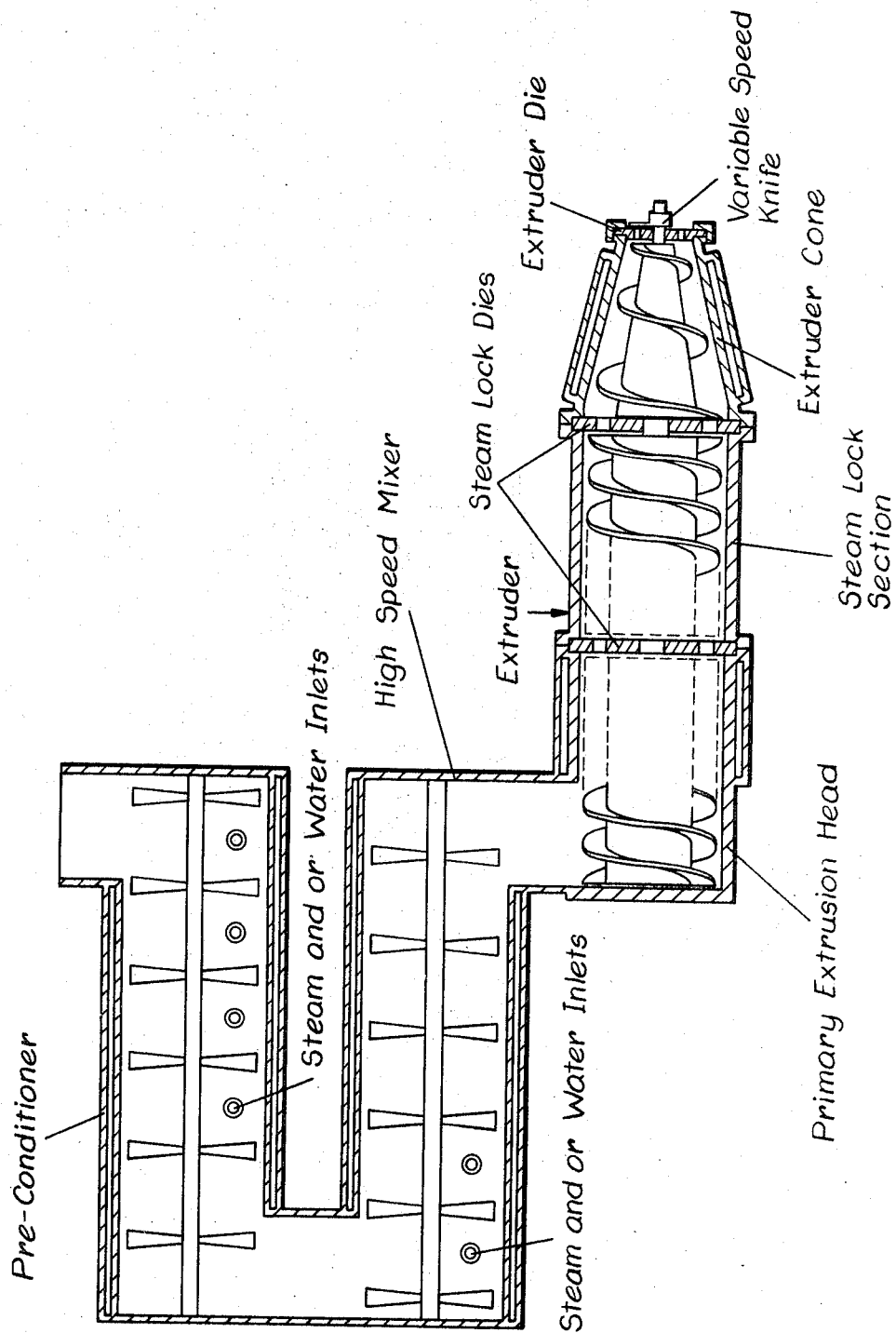

FEED PRODUCT CONTAINING NONPROTEIN NITROGEN COMPOUNDS AND METHOD FOR PRODUCING SAME

This is a continuation-in-part of our now abandoned application Ser. No. 517,074, filed Dec. 28, 1965, and entitled IMPROVED FEED PRODUCT CONTAINING NONPROTEIN NITROGEN COMPOUNDS AND METHOD FOR PRODUCING SAME, as well as our now abandoned application Ser. No. 601,223, filed Dec. 12, 1966, of the same title.

This invention relates to a reacted, palatable, nontoxic, processed food product for ruminant animals as well as to a process for producing the product wherein the composition contains modified, interacted energy and protein-producing constituents derived from a starch-bearing material and a nonprotein nitrogenous (NPN) substance respectively. By virtue of the fact that the starch-bearing material in an initially ungelatinized condition and the NPN substance are processed in the presence of sufficient moisture and under conditions of heat and pressure to assure gelatinization of the starch while intimately intermingled with the NPN substance, a much larger proportion of the nonprotein nitrogenous substance may be successfully employed in the feed composition than heretofore possible.

It is known that nonprotein nitrogenous substances such as urea may be incorporated into feeds for ruminants as replacement for protein sources therein. However, palatability and toxicity problems inherent in the addition of urea to cereal grains and other conventional feeds such as grasses, roughage and vegetable starches, have severely limited the amount of NPN that can be mixed with the normal feed ration. Generally, no more than about 4 percent by weight of urea could heretofore be successfully added to ruminant feed compositions without undesirable results, because of toxic reactions, inefficient utilization of urea, segregation of the constituents, unpalatability of the feed, and the tendency of the mixture to form a solid block by virtue of the hygroscopic nature of the urea.

The reacted composition produced in accordance with the novel process of this invention is characterized by an increase in protein synthesis in the rumen and a protein assimilability efficiency significantly greater than could be attained in any usable mixture of the starch bearing material and the NPN substance without combined processing thereof. In addition, the modified, interacted and combined constituents of the reacted composition have been found to be hydrolyzable within the rumen of an animal at sufficiently similar rates to substantially increase the convertibility of the ammonia available from the protein producing constituent into microbial protein without resultant toxicity.

Ruminants such as cattle, sheep and goats have a complex digestive tract including several stomachlike organs. The first of these stomachs is called the rumen. Normally, food eaten by the animal is swallowed and passed into the rumen from where it is regurgitated in masses and thoroughly masticated and mixed with saliva while the animal is at rest. This masticated mixture is then reswallowed and passed again into the rumen where it is fermented by micro-organisms (bacteria and protozoa). The rumen provides a suitable environment for bacteria and, in fact, a substantial population of the latter resides therein. Rumen bacteria are capable of hydrolyzing urea and NPN sources such as biuret, various amides, nitrogenous acids and ammonium salts into ammonia when the same are present in the food passed into the rumen. The ammonia formed by such hydrolyzation is metabolized by bacteria in the rumen to form amino acids and then microbial protein which is usable by the animal to supplement its normal protein diet thus allowing the natural protein intake of the animal to be decreased when nonprotein nitrogen is included with the rations fed to such an animal.

Theoretically, there is enough bacteria present in the rumen of such an animal to metabolize the ammonia and form all of the protein required for the maintenance and production of the animal. Naturally occurring proteins contain approximately 16 percent nitrogen by weight. Urea as presently commercially available contains approximately 42 to 45 percent nitrogen by weight depending on the type or grade thereof and thus 1 pound of urea will replace roughly 2.62 to 2.81 pounds of such natural protein feed. If sufficient carbohydrate is furnished in the ration, one pound of urea will ideally be converted by bacteria to form approximately 2.62 to 2.81 pounds of microbial protein, thus replacing approximately 2.62 to 2.81 pounds of natural protein otherwise required to be furnished. One pound of urea plus an amount of energy equivalent to that occurring in a natural protein is less expensive than an equivalent amount of natural protein feed and, therefore, it is desirable from an economical standpoint to supply as much as possible of the protein required in the animal's diet from a nonprotein nitrogen source such as urea. However, it is desirable that the NPN substance and the carbohydrate material be broken down at substantially the same rate for most efficient production of microbial protein.

Because of the foregoing, large quantities of urea and other NPN sources are used in the beef and milk-producing industries; however, the toxic nature of such nonprotein nitrogen limits the use thereof. The major problem arises because of the nature of the mechanism of the protein-producing reactions. The bacteria in the rumen acts to hydrolyze urea, etc., into ammonia which, in turn, is metabolized by the bacteria to form amino acids and the microbial protein. However, hydrolyzation of NPN substances in heretofore used form is so rapid that excessive quantities of ammonia may be developed unless limitations are imposed on the relative amount of such nitrogen in the feed and on the total intake by the animal during any certain period. Excessive rumen ammonia is absorbed through the rumen wall before it can be converted by bacteria to form microbial protein and is carried to the liver for conversion to urea and elimination from the animal by the natural processes of the kidneys. If ammonia is absorbed through the rumen wall more rapidly than the rate of such conversion and elimination through natural processes, the death of the animal can result.

Another problem inherent in heretofore used NPN supplemented feed is the unpalatability of such feed. Cattle will often reject such a feed containing urea even though the quantity of urea contained therein is insufficient to cause severe toxic effects. This heretofore present palatability problem has decreased the practical effect which would otherwise be obtainable through the use of nonprotein nitrogen feed supplementation.

An additional problem which has been inherent in the feeding of nonprotein nitrogenous substances is the inefficient utilization of the ammonia formed by hydrolyzation of the NPN source. Even though the rate at which ammonia is absorbed through the rumen wall is not sufficient to cause severe toxic effects, some ammonia so absorbed is lost by the elimination processes of the animal and thus rendered unavailable to form microbial protein. This decreases the economies of such practices and limits the benefits otherwise theoretically obtainable.

It is, therefore, the primary object of this invention to provide a reacted, palatable and nontoxic ruminant food product containing a protein producing constituent derived from a NPN substance combined with an ingredient containing gelatinized starch derived from an initially ungelatinized starch bearing material in a novel interacted relationship for releasing ammonia when subjected to bacterial attack in the rumen of a ruminant in a manner sufficient to cause the formation of a greater quantity of bacterial protein in the rumen than has heretofore been possible using conventional feeds, thus supplementing the protein intake of the ruminant so that the natural protein content of the normal diet of such an animal may be decreased.

A very important object of this invention is to provide a novel reacted feed for ruminant animals containing a gelatinized starch bearing material combined with a greater quantity of a NPN substance such as urea, other amides, ammonium salts, biuret, or nitrogenous acids than has heretofore been possible while maintaining the toxicity thereof at a nonharmful level and without decreasing the palatability thereof so that a greater quantity of the ammonia normally present in the rumen of such an animal can be converted into microbial protein by the metabolism of the NPN with such bacteria, thus decreasing the quantity of protein which otherwise is required to be fed to the animal as a part of its normal diet. As a corollary to this object, it is an aim of this invention to provide such a processed feed as described wherein a major proportion and preferably substantially all of the starch bearing material is gelatinized so that after the feed has been eaten by the animal and is therefore situated in the rumen thereof, the action of the rumen bacteria population to hydrolyze the NPN into ammonia is inhibited and the rate of ammonia release is controlled at a level such that the bulk of the ammonia produced is metabolized by the bacteria to form microbial protein rather than absorbed through the rumen wall to cause toxic complications in the animal's organs or at least to be wasted by natural elimination processes.

Another important object of this invention is to provide a novel processed ruminant feed supplemented with a NPN substance and containing a starch material which has been gelatinized while combined with the NPN, thus causing the feed to have greater palatability than heretofore used conventional feeds containing an equivalent amount of nonprotein nitrogen.

Still another important object of this invention is to provide a reacted feed for ruminant animals containing a NPN substance combined with a gelatinized starch material wherein the tendency of the NPN to be converted to ammonia by rumen bacteria attack is inhibited and the rate of ammonia release in the rumen of a ruminant after being fed such a feed is therefore controlled sufficiently to decrease the relative quantity of ammonia present in the rumen at any given time so that the rate of ammonia absorption through the rumen wall is lower than when heretofore known feeds containing equivalent amounts of nonprotein nitrogen were fed to ruminants.

A particularly important object of the invention is to provide a processed feed product for ruminants including a modified starch bearing material in gelatinized state and derived from a source such as cereal grain and a NPN substance derived from a source such as urea wherein a major portion of the starch portion of the grain is gelatinized while intimately intermingled with the urea to favorably improve the reaction rate of the urea in the rumen of the animal. Rumen micro-organisms require energy for the conversion of urea or other NPN to microbial protein. When ungelatinized starch is fed the rate of energy release from this starch is apparently too slow to provide the micro-organisms with the necessary energy to convert the rapidly evolving ammonia from urea to microbial protein. When starch is gelatinized the carbohydrate material and the nitrogenous substance are broken down at substantially the same rate resulting in the most efficient production of microbial protein. Such improved results are also believed to be attributable to more complete blending of the urea with the grain, and the cellular character of the gelatinized starch matrix carrying the constituent or constituents from the original urea addition contributes to more uniform and controlled release of the urea at a desirable rate for most efficient utilization thereof without toxic effects.

A further important object of this invention is to provide a method for processing a mixture of starch food material and a NPN source by heating the mixture in the presence of moisture to a temperature sufficiently high to cause gelatinization of at least a major proportion of the starch in the mixture so that the latter is rendered more palatable, less toxic, and a more efficient source of NPN than similar unprocessed mixtures heretofore produced.

An additional important object is to provide a reacted feed composition of the characteristics described which lends itself well to processing in a manner to produce a free-flowing granular material with excellent handling and storing properties with the unexpected side benefit of freedom from caking notwithstanding the high levels of urea initially added.

The single FIGURE of the drawing is a schematic showing of an extruder-cooker useful in processing an admixture of starch-bearing material and an NPN substance in the presence of sufficient moisture to gelatinize a major proportion of the starch and produce a starch reacted NPN product.

The amount of protein necessary for the maintenance and well-being of a ruminant depends on the animal itself, as well as the nature of the industry in which the animal is used. For example, a steer being fattened for slaughtering may require a different amount of protein intake than a lactating dairy cow. Thus, the amount of protein to be administered is a matter of selection and likewise, the amount of NPN used as a supplement is based on the requirements of the particular industry. It is to be understood that it is not only the relative quantity of NPN contained in the feed which causes the detrimental effects explained above, but also the total NPN intake in a given period.

Generally, the processed NPN supplemented ruminant food of the instant invention is produced by admixing starch containing vegetable material with an NPN source and then subjecting the admixture to sufficient heat and pressure and in the presence of sufficient moisture to cause gelatinization of the starch to occur while the constituents are maintained in intimately intermingled relationship. If necessary, water is added to bring the total moisture to a level within the range of from about 15 percent to approximately 30 percent. The admixture is subjected to the processing conditions for a period of time sufficient to effect gelatinization of at least about one half of the starch and preferably substantially all of the same. Specific food processing methods, including compositions of mixtures, temperatures and identification of components, are detailed below. However, it is to be understood and appreciated that the scope of the present invention is substantially broader than the examples given to explain certain limited and specific forms of the invention.

The product of the instant invention may be formulated from various starch bearing food materials such as cereals including corn, sorghum, barley, oats, wheat, rice, millet, and cereal hybrids; grasses; roughage; vegetable starches such as potatoes and yams; or mixtures of these materials. It is preferred though that a cereal grain be used. Exemplary NPN substances include urea, biuret, ethylene urea, ammonium phosphate, ammonium bicarbonate, ammonium chloride, ammonium sulfate, ammonium carbonate, ammonium carbamate, ammonium citrate, ammonium formate, ammonium acetate, ammonium propionate, ammonium lactate, ammonium succinate, ammonium fumarate, ammonium malate, diammonium phosphate, propionamide, butyramide, formamide, acetamide, creatinine and creatine. Urea is the preferred NPN source.

Although the ratio of NPN to starch bearing material may be varied as dictated by price considerations, availability of constituents, processing requirements, and ultimate end use parameters, the proportions must be maintained within certain limits not only from the standpoint of operability but also commercial feasibility. For example, unless sufficient NPN is provided in the initial mixture to warrant inclusion thereof from an economic as well as nutritional standpoint, the cost of processing the constituents is prohibitive. On the other hand, if the quantity of NPN present in the admixture is increased to a level where the final product is unpalatable even in a processed condition because of excess NPN and the composition is completely unmanageable in use, then the processed product has no significant utility as a ruminant feed. For example, at very high NPN levels, the resulting composition becomes too doughy and sticky to be useful and the agglomerate mass is extremely difficult to handle or store for practical periods of time.

Illustrative NPN compounds usable in the present invention and the preferred ranges thereof in the final starch reacted NPN product are set forth in Table I hereunder:

TABLE I

| NPN compound | Nitrogen content of NPN compound, percent | PE[1] of NPN compound, percent | NPN compound added to produce a starch reacted NPN product, percent by weight | | PE in starch reacted NPN product,[2] percent by weight | |
|---|---|---|---|---|---|---|
| | | | Min. | Max. | Min. | Max. |
| Urea | 45.00 | 281.25 | 5.5 | 18.7 | 24 | 60 |
| Biuret | 40.77 | 254.81 | 5.6 | 20.8 | 24 | 60 |
| Ethylene urea | 32.54 | 203.38 | 7.7 | 26.3 | 24 | 60 |
| Ammonium phosphate | 12.17 | 76.06 | 22.4 | 76.0 | 24 | 60 |
| Ammonium bicarbonate | 17.72 | 110.75 | 14.7 | 50.1 | 24 | 60 |
| Ammonium chloride | 26.18 | 163.62 | 9.7 | 33.0 | 24 | 60 |
| Ammonium sulfate | 21.20 | 132.50 | 12.1 | 41.3 | 24 | 60 |
| Ammonium carbonate | 26.35 | 164.69 | 9.6 | 32.8 | 24 | 60 |
| Ammonium carbamate | 35.89 | 224.31 | 7.0 | 23.7 | 24 | 60 |
| Ammonium citrate | 12.39 | 77.44 | 22.0 | 74.5 | 24 | 60 |
| Ammonium formate | 22.21 | 138.81 | 11.6 | 39.3 | 24 | 60 |
| Ammonium acetate | 18.17 | 113.56 | 14.3 | 48.8 | 24 | 60 |
| Ammonium propionate | 19.17 | 119.81 | 13.5 | 46.4 | 24 | 60 |
| Ammonium lactate | 13.08 | 81.75 | 20.6 | 70.1 | 24 | 60 |
| Ammonium succinate | 18.41 | 115.06 | 14.1 | 48.1 | 24 | 60 |
| Ammonium fumarate | 18.58 | 116.12 | 14.0 | 47.6 | 24 | 60 |
| Ammonium malate | 16.66 | 104.12 | 15.8 | 54.3 | 24 | 60 |
| Diammonium phosphate | 21.21 | 132.56 | 12.1 | 41.3 | 24 | 60 |
| Propionamide | 19.17 | 119.81 | 13.5 | 46.0 | 24 | 60 |
| Butyramide | 16.08 | 100.50 | 16.4 | 55.7 | 24 | 60 |
| Formamide | 31.10 | 194.38 | 8.1 | 27.5 | 24 | 60 |
| Acetamide | 23.72 | 148.25 | 10.8 | 36.6 | 24 | 60 |
| Creatinine | 37.15 | 232.19 | 6.7 | 22.8 | 24 | 60 |
| Creatine | 32.05 | 200.31 | 7.8 | 26.6 | 24 | 60 |

[1] PE (Protein equivalent) calculated by multiplying N by 6.25.
[2] Total of PE of corn or sorghum grain containing 9% protein and PE of NPN.

As is apparent from the above table the total PE of the starch reacted NPN product is preferably maintained within the range of about 24 percent to approximately 60 percent by weight. Reacted products containing NPN compounds added within the specified range exhibit the desirable properties of increased palatability over unprocessed mixtures of grain and NPN, less toxicity than equivalent quantities of untreated grain and NPN.

The amount of moisture required in the mixture of starch bearing material and NPN substance to assure necessary gelatinization of the starch is variable within certain limits, but the preferred range is from about 15 percent to approximately 30 percent by weight of the total admixture. Most starch bearing materials inherently contain a certain amount of water as a part thereof and this quantity is included in determining the moisture content of the admixture ready for processing. For example most dry corn contains 12 to 14 percent moisture and this quantity is taken into account in determining the amount of water to be added to the mixture prior to processing thereof. Sufficient water must be available in the mixture of starch bearing material and NPN substance mixture during processing to cause a major proportion (i.e., from about 50 percent to approximately 100 percent) of the starch in the material to be disrupted and thereby gelatinized upon heating in the presence of the water to thus produce a gel structure. Consequently the instant invention contemplates the addition of sufficient water to the mixture of starchy material and the nonprotein nitrogen source prior to or during processing and either as a liquid or in the form of steam to assure gelatinization of a major proportion of the starch granules in the method chosen for production of the food product. Best results are obtained in processing corn and urea for example when the total moisture content of the admixture during processing is at about the 20 percent level.

One useful method of processing the starch-bearing material and NPN admixture is through the use of an expansion cooker such as a cooking machine of the extruder type as shown in the drawing. In this type of machine the premixed starch bearing material and NPN are introduced into the machine hopper where the admixture is moved longitudinally along the preconditioning zone by an auger, discontinuous conveyor flights or paddles. The starch bearing material is preferably in comminuted form (e.g., grain should be ground in a hammer mill through a 4/64-inch screen) so that water and/or steam blended with the mixture in the preconditioning zone is brought into intimate contact with the starch bearing material. The preconditioner as well as the high speed mixer section following it are both steam jacketed to permit heating of the mixture. If necessary, additional steam and/or water may be added in the mixer section to bring the total moisture level to the desired range of from 15 to 30 percent. The temperature of the composition leaving the high speed mixer and entering the primary extrusion head of the extruder is normally at a level of from about 200° to approximately 220° F. The extruder section, preferably including a primary extrusion head along with an extruder cone and in many instances a steam lock section, is provided with an auger conveyor of variable pitch longitudinally thereof. As a result, the composition conveyed to the extruder is subjected to high shear and compressive forces in addition to heat supplied from the steam jackets around at least the extrusion head and cone sections. The temperature of the composition is gradually increased as it approaches the end die so that a level of from about 250° to approximately 350° F. is reached at the die outlet openings. The die causes pressures of at least several hundred pounds (generally 400–500 p.s.i.) to be maintained on the composition as it moves through the extruder section. The cooked and thoroughly mixed composition is extruded through the die openings of the die plate so that an expanded and gelatinized product is obtained as the pressure on the composition is suddenly released. The processing conditions should be controlled so that at least about 51 percent of the starch granules in the starch bearing material are gelatinized and preferably from about 80 to 100 percent thereof. For most efficient operation and to assure optimum processing of the admixture, the total residence time of the composition in the combination preconditioning and mixing zone and the pressure zone should be maintained within the range of 2 to 5 minutes. The expanded product is in the form of elongated rods which may be cut by conventional means (e.g., the variable speed knife illustrated) to a suitable size, dried (the final reacted product should have a moisture level below about 14 percent for safe storage and handling) and subjected to well known crushing techniques to obtain a granular product for easier handling.

Preferred processing condition ranges for grain-urea admixtures at PE levels ranging from 24 to 54 percent and using an extruder-cooker of the general type shown schematically in the drawing are set forth in tabular form in Table II below (calculated on basis of 281.25 PE urea):

TABLE II

| | Temp. | | Moisture | | Pressure, p.s.i. | | Time | |
|---|---|---|---|---|---|---|---|---|
| | Min. | Max. | Min. | Max. | Min. | Max. | Min. | Max. |
| 24% PE: | | | | | | | | |
| Preconditioning zone | 200 | 220 | 20 | 30 | Atmospheric | | 1 | 2½ |
| Pressure zone | 250 | 350 | 20 | 30 | 400 | 500 | 1 | 2½ |
| 34% PE: | | | | | | | | |
| Preconditioning zone | 200 | 220 | 18 | 25 | Atmospheric | | 1 | 2½ |
| Pressure zone | 250 | 350 | 18 | 25 | 400 | 500 | 1 | 2½ |
| 44% PE: | | | | | | | | |
| Preconditioning zone | 200 | 220 | 18 | 25 | Atmospheric | | 1 | 2½ |
| Pressure zone | 250 | 350 | 18 | 25 | 400 | 500 | 1 | 2½ |
| 54% PE: | | | | | | | | |
| Preconditioning zone | 200 | 220 | 15 | 25 | Atmospheric | | 1 | 2½ |
| Pressure zone | 250 | 350 | 15 | 25 | 400 | 500 | 1 | 2½ |

Specific processing runs of grain-urea admixtures having a PE of from 24 to 73 percent set forth in Table III hereunder are typical of variations in processing conditions required for different levels of NPN. When the proportion of NPN to starch-bearing material approaches a PE of about 50 percent, it is desirable that only a limited amount of moisture be added and preferably in the form of steam in order to preclude formation of an excessively tacky and adhesive reacted product which would be difficult to handle and distribute on a commercial basis.

TABLE III

| Protein equivalent of admixture processed | Water added* lb./min. | Steam added lb./min. | Estimated % Moisture (Product moisture + added water | Temperature at discharge point from cooker |
|---|---|---|---|---|
| 24 | 3.5 | ±3 | 22.8 | 350 |
| 24 | 3.5 | 3.0 | 22.8 | 305 |
| 28 | 4.0 | 6.0 | 28.7 | 250 |
| 29 | 2.5 | ±3 | 21.2 | 350 |
| 34 | 1.75 | ±3 | 19.9 | 350 |
| 38 | 0.0 | 6 | 22.0 | 300 |
| 44 | 3.5 | 3.0 | 22.8 | 375 |
| 44 | 3.0 | 3.0 | 22.0 | 350 |
| 45 | 4.0 | 3.0 | 23.7 | 300 |
| 56 | 0.0 | 6.0 | 22.0 | 250 |
| 73 | 0.0 | 3.0 | 17.0 | 275 |

* Processing rate = approximately 60 lb./min.

The processes described above result in production of a reacted food product having gelatinized starch therein which contains sufficient nonprotein nitrogen to supplement the diet of the ruminant. Notwithstanding the fact that the amount of NPN used in the formulation subjected to processing is substantially greater than feed mixtures heretofore used, the gelatinization of the starch portion thereof causes the nonprotein nitrogen to be more efficiently used since experimentation has indicated that an animal fed with the improved product will convert a greater quantity of ammonia from urea to bacterial protein than one fed with a mixture where the starch portion is ungelatinized. Further, the gelatinized food product is not toxic and much more palatable than ungelatinized mixtures containing an equivalent amount of nonprotein nitrogen. Food wastage is thereby minimized.

Varying theories are known concerning the mechanism of the microbial protein producing reaction in the rumen. It is known for example, that ammonia is absorbed into the ruminal blood vein and carried via the portal system to the liver where the ammonia is converted to urea and this urea is eliminated by the kidneys. The measurement of the quantity of ammonia in the rumen or the blood of a ruminant animal after being fed a nonprotein nitrogen source is an index of the amount of nitrogen wasted by absorption of ammonia through the rumen wall. Also, the toxicity of such a source is measured by the ability thereof to increase the rumen and blood ammonia by producing ammonia at a rate faster than the same can be converted to urea and eliminated by natural processes. A high correlation exists between the blood ammonia and rumen ammonia level. Ruminants fed with the reacted food product of this invention exhibit lower rumen ammonia levels than similar animals fed with heretofore known conventional food mixtures containing an equivalent quantity of nonprotein nitrogen.

An analytical study of this result shows that the improved and novel reacted food product of this invention has properties which result in a more efficient usage of the nonprotein nitrogen contained therein with respect to the formation of microbial protein since a lesser quantity of ammonia has escaped from the rumen. Furthermore, it has been established that the toxicity of a food product produced in accordance with the present method is lower than the toxicity of the heretofore known nonprotein nitrogen supplemented foods containing an equivalent quantity of nonprotein nitrogen because the ammonia present in the rumen of a ruminant animal after being fed the former is less than when fed the latter. Also, animals receiving the former lived, while paired controls receiving the latter died from urea toxicity.

Likewise, the phenomenon of gelatinization has been heretofore disclosed in various publications and many theories have been advanced for the mechanisms of the occurrence including the theory that starch chains in ungelatinized starches are held together by glucoside linkages such that ungelatinized starch is substantially insoluble in water and that these linkages are broken down and simpler carbohydrates are formed during the gelatinization or hydrolyzation of the starch such that the gel structure results. However, it is not the intention of the inventors of the present invention to be limited by any particular starch-producing mechanism but rather only that typical gel characteristics are present in the novel product.

Having thus described the invention, what is claimed as new and desired to be secured by Letters Patent is:

1. A method of producing a palatable and nontoxic food product for feeding ruminant animals and comprising the steps of:
   admixing a predetermined quantity of an edible, ungelatinized starch-bearing food material selected from the group consisting of corn, sorghum, barley, oats, wheat, rice, millet, hay, silage, potatoes, yams, and mixtures thereof, with a predetermined amount of at least one nonprotein nitrogenous substance selected from the group consisting of urea, biuret, ethylene urea, ammonium phosphate, ammonium bicarbonate, ammonium carbamate, ammonium citrate, ammonium formate, ammonium acetate, ammonium propionate, ammonium lactate, ammonium succinate, ammonium fumarate, ammonium malate, diammonium phosphate, propionamide, butyramide, formamide, acetamide, creatinine, and creatine, and characterized by the property of being hydrolyzable to ammonia by rumen bacteria,
   the amount of said substance added being within the range of about 5 percent to approximately 76 percent by weight compared with said predetermined quantity of said starch-bearing material and thereby substantially in excess of the amount of said substance that would be tolerable as to toxicity and minimum palatability if merely mixed with the material for feeding to said animals, a sufficient quantity of said substance being provided in the admixture to cause the latter to have a total protein equivalent within the range of about 24 percent to approximately 60 percent by weight and the total moisture content of the admixture being from 15 to 30 percent by weight to produce gelatinization of the starch bearing material when the latter is subjected to elevated heat and pressure;

continuously moving the admixture into and through a separate treatment zone while agitating the admixture, and subjecting the latter to a source of heat and high compressive and shear forces sufficient to raise the temperature of the composition to a level of about 250° F. to approximately 350° F. under a pressure of about 400 to 500 p.s.i.;

applying said heat, and compressive and shear forces to the admixture in said zone for a time period to cause gelatinization of a major proportion of the starch-bearing material in the presence of said moisture and while the material is intimately intermingled with the substance to provide a reacted composition; and by extrusion suddenly releasing the pressure on the composition as it continuously leaves the zone to produce an expanded and gelatinized product.

2. A method as set forth in claim 1, wherein said substance is urea.

3. A method as set forth in claim 1, wherein is included the steps of;
advancing said admixture through a preconditioning zone having a steam inlet means, prior to introduction of the admixture into said separate treatment zone; and
introducing a fluid selected from the group consisting of steam, water and mixtures thereof through said inlet means for blending with the admixture.

4. A method as set forth in claim 1, wherein is included the step of maintaining the admixture under said pressure and at an elevated temperature in said separate treatment zone for a period of from 2 to 5 minutes.

5. A palatable and nontoxic food product for feeding ruminant animals produced in accordance with the process of claim 1.

* * * * *